United States Patent [19]

Borawski

[11] Patent Number: 5,095,645
[45] Date of Patent: Mar. 17, 1992

[54] FISHING LURE HOLDER

[76] Inventor: Douglas Borawski, 7256 Aqua Isle, Algonac, Mich. 48001

[21] Appl. No.: 638,059

[22] Filed: Jan. 7, 1991

[51] Int. Cl.5 .......................................... B65D 85/00
[52] U.S. Cl. ................................ 43/57.1; 206/315.11
[58] Field of Search ............................... 43/54.1, 57.1; 206/315.11, 561

[56] References Cited

U.S. PATENT DOCUMENTS

| | | | |
|---|---|---|---|
| 3,775,895 | 12/1973 | Jachim | 43/54.1 |
| 3,897,650 | 8/1975 | Pilston | 43/54.1 |
| 4,033,066 | 7/1977 | Morcom | 43/54.1 |
| 4,825,584 | 5/1989 | Raley | 43/57.1 |
| 4,827,658 | 5/1989 | Wolniak | 43/57.1 |
| 4,927,016 | 5/1990 | Fuller | 206/315.11 |
| 4,970,821 | 11/1990 | Young | 43/57.1 |

Primary Examiner—Kurt Rowan
Assistant Examiner—James Miner
Attorney, Agent, or Firm—Brooks & Kushman

[57] ABSTRACT

A fishing lure card for holding fishing lures and a card holder for holding a plurality of these cards are disclosed. The fishing lure card includes a row of vertical interconnected transparent tubular sleeves, in which fishing lures may be suspended, and a pair of mounting ears. The card holder has two laterally spaced vertical side members having slots to receive the mounting ears of the fishing lure cards. The card holder further includes a detachable cover and is pivotably attachable to the gunnel of a boat. This arrangement keeps fishing lures readily available, visible and untangled when the card holder is mounted to the side of a boat.

8 Claims, 3 Drawing Sheets

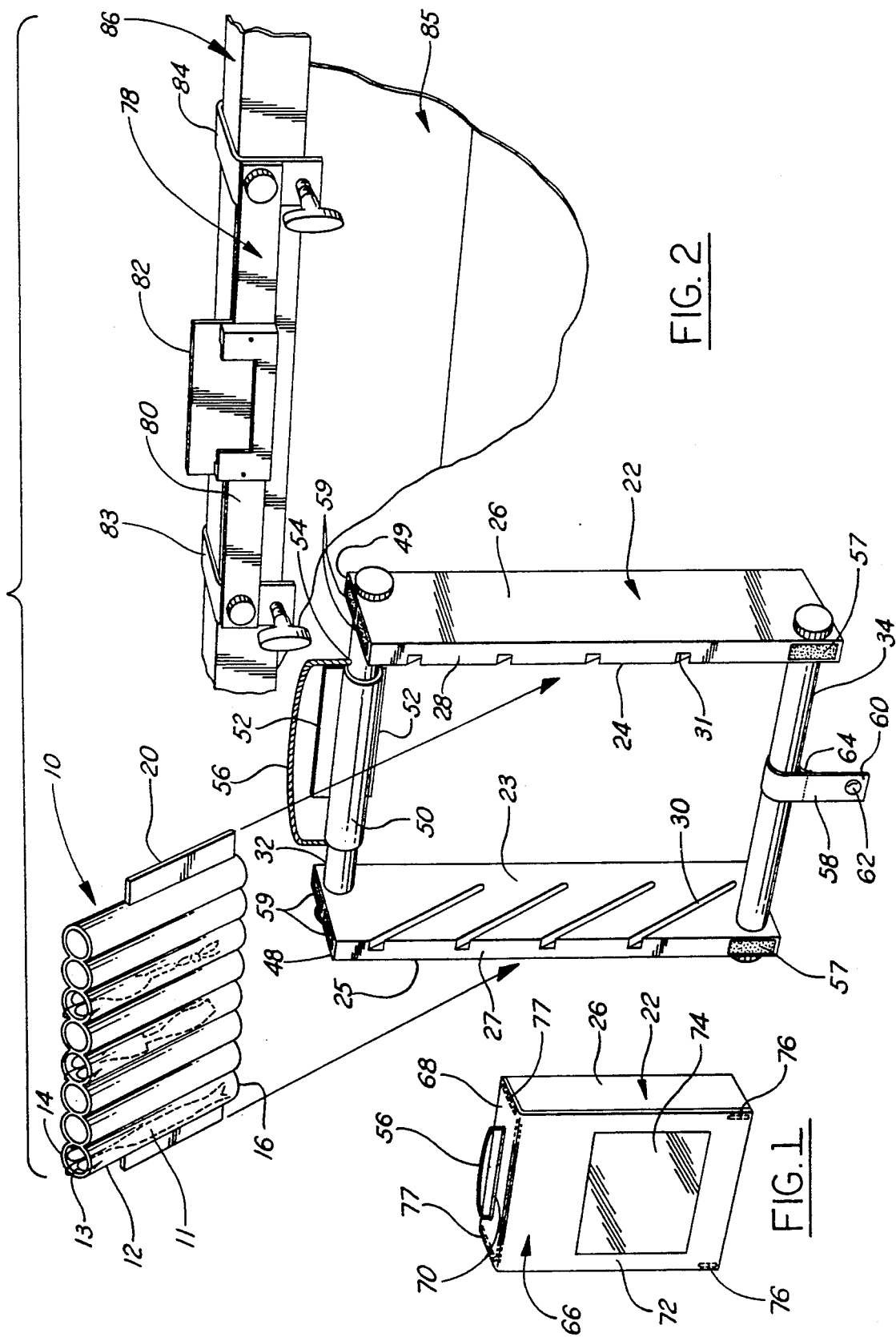

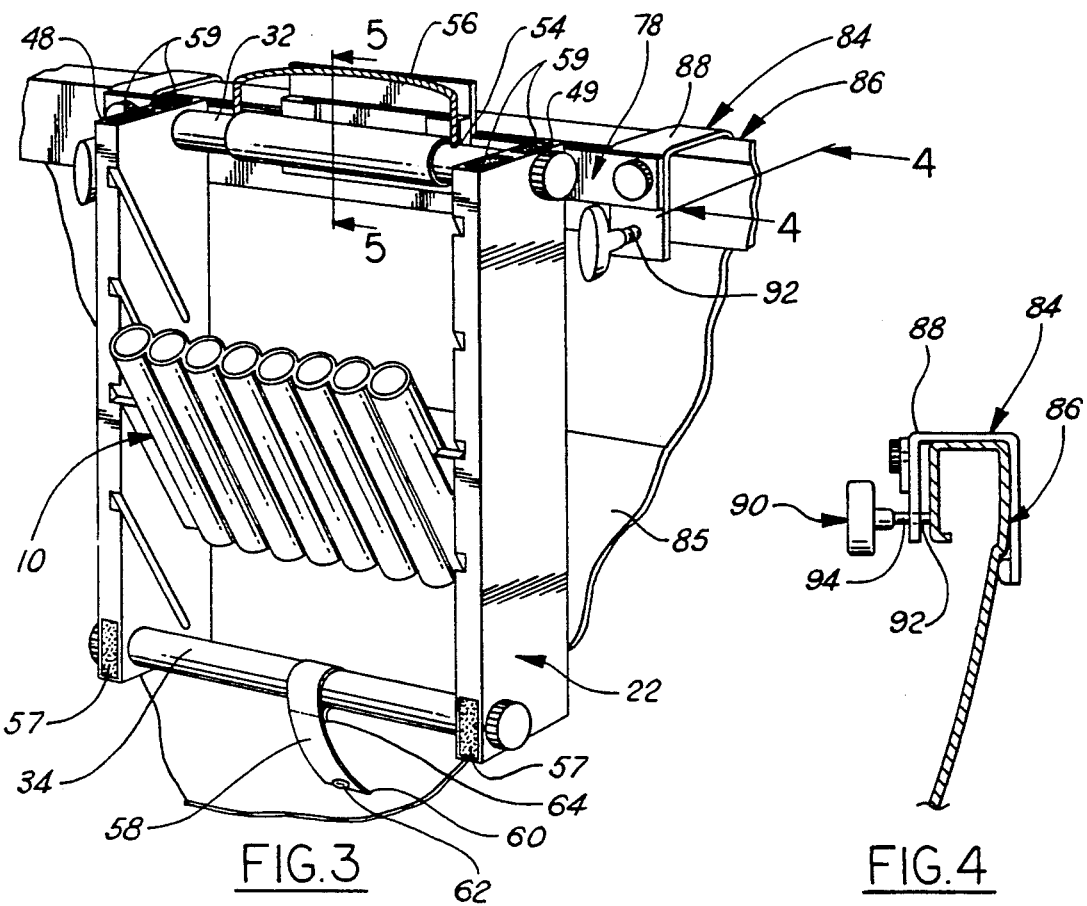
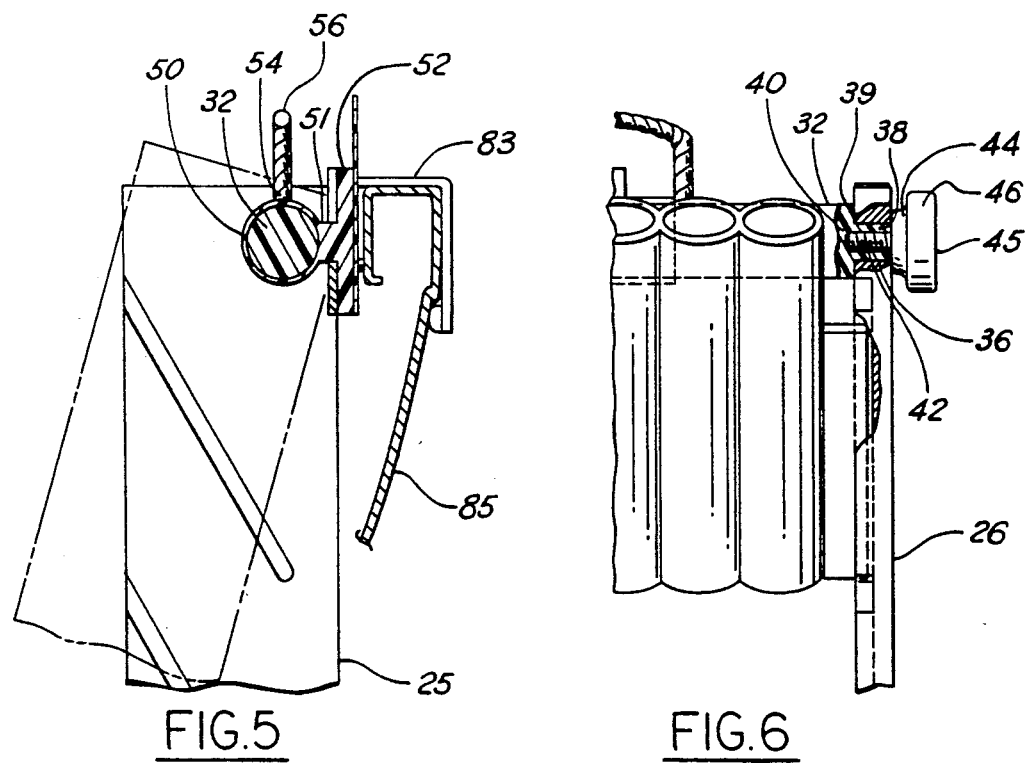

FISHING LURE HOLDER

TECHNICAL FIELD

This invention relates generally to structures that hold fishing tackle, and more particularly, to a structure having individualized compartments for holding fishing lures and are mountable to a gunnel of a boat.

BACKGROUND ART

The storage of fishing lures in a conventional tackle box within a boat has several disadvantages. First, the tackle box may be located anywhere in the boat, is typically unsecured and may slide about, and also, may serve as an obstruction. In order to retrieve lures therefrom, the tackle box must first be found, a not insignificant job at night. A second disadvantage is that in order to determine what lures are in the tackle box, the tackle box must be opened, and often layers of storage compartments searched. Finally, a third disadvantage is that the lures may become intertangled with other lures or with other fishing apparatus contained within the tackle box, necessitating the freeing of the lures prior to removal. The present invention overcomes these disadvantages.

DISCLOSURE OF INVENTION

This invention includes a fishing lure card for holding fishing lures and a card holder capable of releasably securing such fishing lure cards and adapted for pivotal mounting to the gunnel of a boat.

The fishing lure card includes a plurality of transparent tubular sleeves, preferably located in a row and having parallel longitudinal axes, having upper open ends from which hooks of fishing lures may be suspended, and a pair of mounting ears securing to the tubular sleeves.

The card holder has two laterally spaced vertical side members, having opposed interior surfaces with generally downwardly and rearwardly extending slots located therein, cooperating to slidably receive the mounting ears of the fishing lure cards. Lower and upper transverse members connect the side members, with the upper transverse member being rotatably encircled by a mounting sleeve, the mounting sleeve having a vertical mounting plate fixedly secured adjacent thereto.

The mounting plate is slidingly received within a pocket assembly attached to the gunnel of a boat. The mounting sleeve allows the card holder to be pivotably attached to boats having sides of variable depth or angle, with the lower end of the card holder angled away from gunnel as necessary. This arrangement keeps fishing lures readily available, visible and untangled when the card holder is mounted to the gunnel of a boat.

The card holder further includes a detachable cover for use when transporting the card holder. The front side of the cover is juxtaposed against the open end of the tubular sleeves to inhibit lures from disengaging therefrom.

An object of the present invention is to provide a storage arrangement for fishing lures which prevent fishing lures from tangling with other fishing lures or apparatus.

Another object is to provide a storage arrangement wherein fishing lures are readily visible and accessible.

A further object is to provide a fishing lure card comprising a row of parallel, interconnected tubular sleeves, having upper open ends through which the lures may be introduced into the sleeves and from which hooks on the lures may be suspended, and with mounting ears at each end of the row for supporting the card in a card holder.

Yet another object is to provide a card holder capable of mounting a fishing lure card.

Another object is to provide a card holder that pivotally mounts to a bracket affixed to the gunnel of a boat such that the card holder may be mounted in boats having sides of varying depth and angle and also wherein the card holder is located at a particular, unobstructive location.

An additional object is to provide a card holder and fishing lure cards constructed and arranged such that a card may be removed from the holder and another card substituted. This enables a fisherman to have several cards, each filled with lures for particular occasions, and to fill the card holder only with those cards containing the lures needed for the upcoming fishing trip.

BRIEF DESCRIPTION OF THE DRAWINGS

FIG. 1 is a perspective view of my fishing lure holder closed up for transport;

FIG. 2 is an exploded view of my fishing lure holder with its cover removed and comprising a fishing lure card securable in a card holder which is pivotably mountable to a bracket clampingly affixed to the gunnel of a boat;

FIG. 3 is a perspective view of a card holder with a single card received therein, with the card holder mounted to the gunnel of a boat.

FIG. 4 is a sectional view taken along line 4—4 of FIG. 3;

FIG. 5 shows a sectional view along line 5—5 of FIG. 3;

FIG. 6 shows a partial cut away frontal view of a transverse member connecting to a side member;

BEST MODE FOR CARRYING OUT THE INVENTION

Figure 7:
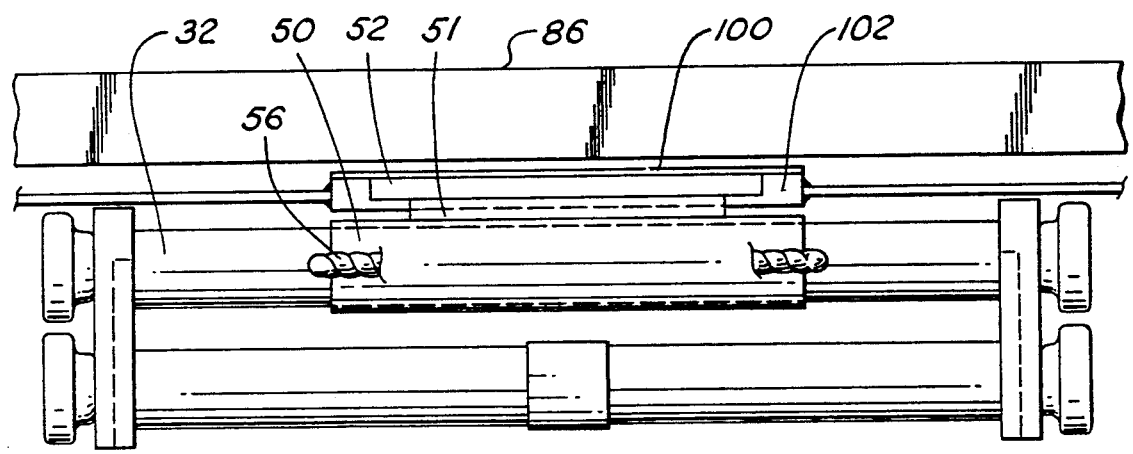
FIG. 7 is a top view of a card holder mounted to the gunnel of a boat.

The present invention has four major components, a fishing lure card 10 for holding fishing lures 11, a card holder 22 for receiving the fishing lure card 10, a cover 66 which is detachable from the remainder of the card holder 22, and a mounting bracket 78 which secures to the gunnel 86 of a boat 85.

Figure 8:
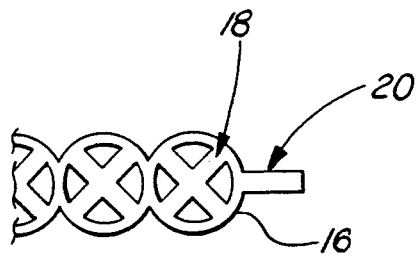
FIG. 8 is a bottom view of closure plates located at the lower ends of tubular sleeves, preventing fishing lures from dropping therethrough.

As seen in FIG. 2, the fishing lure card 10 includes a row of transparent, interconnected tubular sleeves 12, defining storage compartments, annular in cross-section, having rectangular mounting ears 20 fixedly secured to and laterally outwardly extending from both ends of the row of tubular sleeves 12. Each tubular sleeve 12 has an upper open end 14 from which a hook 13 of fishing lure 11 is suspended, and a lower closed end 16. As seen in FIG. 8, at lower ends 16 are X-shaped closure plates 18 which allow water, but not a fishing lure 11, to pass through. The longitudinal axes of the sleeves 12 and the mounting ears 20 are parallel and lie in a common plane. The mounting ears 20 are flush with lower end 16 and extend only partially along the longitudinal length of sleeves 12. Preferably, sleeves 12 are made of a clear acrylic plastic. However, any other suitable clear plastic of sufficient strength and ductility will work.

The card holder 22 includes laterally spaced vertical left and right side members 25 and 26, left and right front surfaces 27 and 28, left and right top surfaces 48 and 49, opposed left and right interior surfaces 23 and 24 with slots 30 and 31, respectively, therein. Side members 25 and 26 are joined by vertically spaced upper and lower transverse members 32 and 34 which are round in cross-section. Slots 30 and 31 are cooperative and sized to slidably receive mounting ears 20 of fishing lure card 10 and extend vertically downwardly and rearwardly from front surfaces 27 and 28, at approximately 30° from the vertical, through most of the width of side members 26 and 27. Preferably, card holder 22 is made from an acrylic plastic or wood.

Each of the four connections of the transverse members 32 and 34 with side members 25 and 26 is generally identical, with a typical connection shown in FIG. 6. The connection, includes an aperture 36 in side member 26 sized to receive a shoulder 38 of transverse member 32. Apertures 36 are located in the upper rear and lower front corners, respectively, of side members 25 and 26 providing clearance between transverse members 32 and 43 and installed fishing lure cards 10. Shoulder 38 is reduced in diameter relative to the remainder of transverse member 32, forming an annular, laterally outward facing end surface 39, with shoulder 38 extending laterally outward therefrom a distance slightly less than the thickness of side member 26.

Fastener 45 includes a knob 46 having a neck portion 44, which is greater in diameter than aperture 36, with a threaded extension 42 threadedly received in a threaded aperture 40 in the transverse member. When fastener 45 is tightened it captures side member 26 between neck portion 44 and end surface 39 and prevents rotation of transverse member 32 relative to side member 26.

As seen in the combination of FIGS. 5 and 7, mounting sleeve 50 rotatably encircles transverse member 32. A spacer block 51 is located between and is fixedly secured to mounting sleeve 50 and a vertical mounting plate 52 and is disposed along their longitudinal axes. Mounting plate 52 lies in vertical plane parallel to mounting sleeve 50. Spacer block 51 is shorter than mounting plate 52. Ends 54 of rope handle 56, which extends vertically upward, are fixedly secured to transverse member 32 laterally outward of each end of mounting sleeve 50.

Further securement means are also located on the card holder 22. Located along the lower ends of front surfaces 27 and 28 are rectangular fastening strips 57, which are preferably hook and loop fasteners such as are sold under the trademark VELCRO. A pair of fastening strips 59, also hook and loop fasteners, are located on the top surfaces 48 and 49. A strap 58 has a terminal end 60 with a snap 62 affixed thereto and a sewn closed loop end 64 which encircles transverse member 34. Snap 62 is cooperative with a button, not shown, located on the floor of a boat to secure transverse member 34 thereto.

As seen in FIG. 1, card holder 22 further includes a cover 66, preferably made of a canvas or suitable plastic material, having a top side 68 containing a slot 70 therein adapted to receive therethrough rope handle 56 when the cover 66 is positioned thereover. Cover 66 also has a front side 72 with a transparent window 74, made of a clear plastic.

Fastener strips 76 located inside front side 72, and fastener strips 77 located beneath top 68, also hook and loop fasteners, are adaptably positioned, relative to fastener strips 57 and 59, respectively, to allow for their engagement when cover 66 is placed against side members 25 and 26. Cover 66 is mounted such that front side 72 is tauntly juxtaposed against open ends 14 of tubular sleeves 12 inhibiting the detachment of hooks 13 of fishing lures il therefrom.

As seen in FIG. 2, mounting assembly 78 comprises a transverse member 80 with a pocket assembly 82 fixedly secured along its mid-length and inverted U-clamps 83 and 84 fixedly secured at each end. FIG. 4 shows U-clamp 84 comprising an inverted U-shaped member 88, having a threaded aperture 92, and a fastener 90 having a threaded stud 94. Member 88 is clampingly juxtaposed to gunnel 86, with threaded stud 94 passing through threaded aperture 92 and tightly abutting against gunnel 86.

Figure 9:
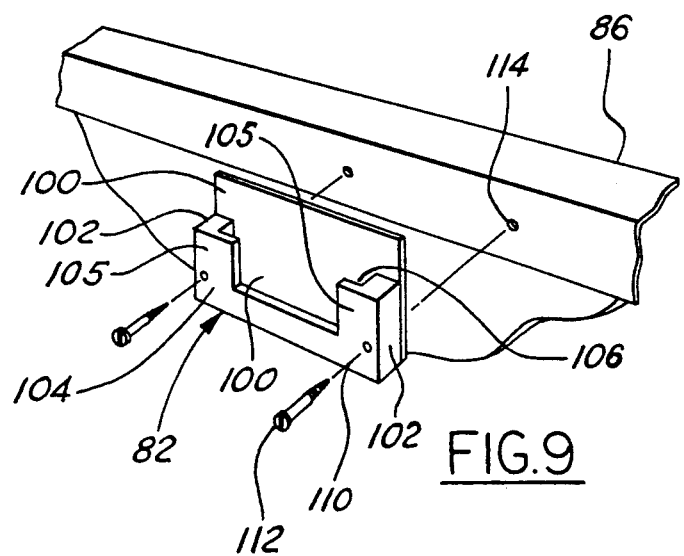
FIG. 9 shows a perspective view of an alternative embodiment wherein a pocket assembly is directly affixed to a gunnel of a boat.

Looking to FIG. 9, pocket assembly 82 is comprised of a vertical back plate 100, laterally spaced spacer blocks 102 with rectangular opening 106 located therebetween, a vertical U-shaped front plate 104 with laterally spaced legs portions 105 having a rectangular opening !08 located therebetween. Front plate 102 is forwardly spaced of back plate 100 with spacer blocks 102 fixedly secured thereinbetween. Opening 106 and 108 are sized and configured to receive, respectively, mounting plate 52 and block 51 of card holder 22 such that mounting plate 52 is captured in opening 106 between back plate 100 and front plate 104 with block 51 passing through opening 108 in front plate 104.

In the preferred embodiment, pocket assembly 82 is fixedly secured to transverse member 80 of mounting bracket 78 as shown in FIG. 2. A second embodiment, as shown in FIG. 9, comprises pocket assembly 82 having apertures 110 through which threaded fasteners 112 pass threadedly securing pocket assembly 82 to threaded aperture 114 in qunnel 86.

In operation, hooks 13 of fishing lures 11 are inserted into and suspended from the upper ends 14 of tubular sleeves 12 of the fishing lure card 10. One or more fishing lure cards 10 are then inserted into a cooperating pair of slots 30 and 31 of card holder 22 to secure fishing lure card 10 therein. The number of fishing lure cards 10 that may be inserted is determined by the number of pairs of cooperating slots 30 and 31 available.

In the event the card holder 22 is to be transported, cover 66 is placed over side members 26 with rope handle 56 extending through slot 70. Fastener strips 76 and 77 of cover 66 are then fastened to fastener strips 57 and 59, respectively, such that front side 72 is tauntly juxtaposed against the open ends 14 of tubular sleeves 12, inhibiting the disengagement of hooks 13 of fishing lures 11 therefrom. To remove cover 66, Velcro strips 76 and 77 are separated from fastening strips 57 and 59, respectively, and cover 66 is lifted vertically upwardly until slot 70 is free of rope handle 56.

To mount card holder 22 to gunnel 86, spacer block 51 and mounting plate 52 are placed vertically over openings 108 and 106 of pocket assembly 82, and lowered vertically downward until spacer block 51 rests upon front plate 104. Simultaneously, as seen in FIG. 5, strap 58 is pulled forwardly and upwardly, with transverse member 32 rotating within mounting sleeve 50, and the lower ends of side members 25 and 26 pivoting away from gunnel 86. When mounting plate 52 is secured within pocket assembly 82, strap 58 is lowered until side members 25 and 26 rest upon the floor or side of the boat and snap 62 of strap 58 is fastened to a button located on the floor (not shown). As slots 30 and 31 were originally directed downwardly and rearwardly from front surfaces 27 and 28, the pivoting of side members 25 and 26 away from gunnel 86 will result the slots 30 and 31, and accordingly, the longitudinal axis of tubular sleeves 12, remaining in a generally vertical plane, and preventing fishing lures 11 from disengaging from open ends 14.

When a particular fishing lure 11 is to be retrieved, the fishing cards 10 with their transparent tubular sleeves 12 are examined until the desired fishing lure 11 is located, and then the fishing lure 11 is lifted therefrom. To suspend a fishing lure 11, an empty tubular sleeve is located and fishing lure 11 is lowered into tubular sleeve 12, until hook 13 suspends from the open end 14. Also, if desired, alternative fishing lure cards 10 may be mounted with slots 30 and 31 to change the composition of fishing lures 11 contained within card holder 22.

The pocket assembly 82, may also be mounted to the wall of a building, allowing storage of the card holder 22 and fishing lure cards 10 along the wall. Alternatively, card holder 22, with cover 66 attached, may be suspended from rope handle 56.

While the best mode for carrying out the invention has been described in detail, those familiar with the art to which this invention relates will recognize various alternative designs and embodiments for practicing the invention as defined by the following claims.

What is claimed is:

1. A fishing lure holder comprising, in combination:
   a plurality of fishing lure cards each comprising a plurality of transparent tubular sleeves connected together along their lengths as a rigid unitary assembly in adjacent parallel relation and each internally sized to receive a fishing lure therein;
   each sleeve being open at the top to receive a fishing lure for storage in the sleeve;
   a card holder comprising a pair of spaced apart elongated side members having opposed interior surfaces, and transverse members extending therebetween adjacent opposite ends of the side members and connecting the side members in a rigid frame;
   means for supporting the card holder with the side members generally upright; and
   said side members having a plurality of opposed pairs of cooperating slots in said interior surfaces arranged in spaced apart relation along the side members and extending angularly across the side members for receiving the fishing lure cards to support the cards in the holder with the open tops of the sleeves uppermost and with the cards displayed in angled relation to facilitate visual recognition of lures in the tubular sleeves.

2. The invention as recited in claim 1 wherein said means for supporting further comprises means for attaching the card holder to the gunnel of a boat.

3. The invention as recited in claim 2 wherein the means for attaching is pivotable.

4. A card holder as recited in claim 3 wherein one of the transverse members is round and the means for attaching includes a member rotatably encircling the round transverse member and being releasably affixable to the gunnel of a boat.

5. A card holder as recited in claim 1 further comprising means for securing a fishing lure within a tubular sleeve.

6. A card holder as recited in claim 5 wherein the means for securing the fishing lure includes a cover juxtaposed the open top.

7. A card holder as recited in claim 6 wherein the cover and the side members have cooperating "VELCRO" fasteners to secure the cover to the side members.

8. A fishing lure holder comprising, in combination:
   a rigid frame having laterally spaced apart side members exhibiting opposed cooperating slots extending angularly across the side members in laterally spaced apart relation;
   a plurality of fishing lure cards each comprising a plurality of relatively rigid transparent tubes arranged in juxtaposed parallel coplanar relation and rigidly connected together along their lengths and each open at one end to receive a fishing lure and closed at the opposite end against passage of a lure;
   each card having oppositely laterally extending flanges at opposite ends for slidable reception in said slots for removably supporting the cards in the frame for displaying the cards in angled relation facilitating visual recognition of lures in the tubes of each card;
   cover means for closing the open ends of the tubes; and
   means for adjustably mounting the frame in a boat to support the open ends of the tubes uppermost.

* * * * *